United States Patent [19]

Verch

[11] 3,909,339

[45] Sept. 30, 1975

[54] TAPE APPLYING DEVICE

[75] Inventor: John T. Verch, Hastings, Minn.

[73] Assignee: Minnesota Mining and Manufacturing Company, St. Paul, Minn.

[22] Filed: Jan. 9, 1974

[21] Appl. No.: 432,061

[52] U.S. Cl................. 156/477 R; 93/36.9; 156/522

[51] Int. Cl.$^2$....................... B32B 31/00; B31B 1/72

[58] Field of Search................ 156/477 R, 478–482, 156/522, 527, 576, 577, 579; 93/36.9

[56] References Cited

UNITED STATES PATENTS

| | | | |
|---|---|---|---|
| 2,596,158 | 5/1952 | Lindsey | 156/522 |
| 2,726,783 | 12/1955 | Erickson | 156/522 |
| 3,027,292 | 3/1962 | Rothenberger | 156/522 |

*Primary Examiner*—Douglas J. Drummond
*Attorney, Agent, or Firm*—Alexander, Sell, Steldt & DeLaHunt

[57] ABSTRACT

A portable device for applying a length of adhesive coated tape around an edge of a box. The device includes an L-shaped guide shoe adapted to contact the edge and adjacent surfaces of a box, and a tape applying head. The tape applying head supports an end part of a tape supply and presses it into engagement with one surface of a box as the guide shoe is positioned in contact over the edge of the box. The tape applying head is then driven from one end to the other of the guide shoe and slides along the tape to apply it around the edge of the box. The device then severs the applied length of tape from the tape supply, and the head is returned to its starting position. Retractable spaced brushes with opposed bristles engage the edges of the tape to retain it on the applying head prior to use of the device, and to subsequently hold the newly severed tape end part against the tape head as it returns to its starting position.

9 Claims, 9 Drawing Figures

TAPE APPLYING DEVICE

BACKGROUND OF THE INVENTION

The present invention relates to devices for applying predetermined lengths of adhesive tape.

Prior art devices are known which can apply a predetermined length of adhesive tape around an edge of a box. Such devices are described in U.S. Pat. Nos. 3,676,266 and 3,076,493.

While such devices may efficiently apply the tape and at least the device of U.S. Pat. No. 3,676,266 has been adapted for portable use, they generally are too complex to provide as light and convenient a portable taping unit as may be desired. Rather than use these prior art tape applying devices, some manufacturers use more portable stapling guns to seal boxes, even though they recognize the greater potential damage which may be caused by staples both to the boxed goods and to customers who will subsequently open the box.

SUMMARY OF THE INVENTION

The present invention provides a mechanically simple device for applying a predetermined length of adhesive tape to a substrate from a supply of tape on the device. The device is easily adapted to apply a length of tape around an edge of a box, and may be made sufficiently portable that it provides a taping device rivaling commercial stapling guns in its ease of use to seal boxes.

The device includes a taping head having first and second adjoining peripheral surface portions, each adapted to contact the nonadhesive side of the tape. Prior to the application of a length of tape, the taping head supports an end part of the tape supply along its first peripheral surface portion, with the end of the tape positioned adjacent the second peripheral surface portion. The first peripheral surface portion and a substrate to which the tape is to be applied are placed in a starting position (i.e. by moving the device, or substrate, or both) with the head forcefully pressing the tape end part into engagement with the substrate. The head and substrate are then moved relative to each other (i.e. by moving the head, substrate, or both) to provide forceful sliding contact between the peripheral surface of the head and the tape with the area of contact therebetween moving away from the end of the tape until a finish position is reached at which the second peripheral surface portion is in contact with the tape and the first peripheral surface portion is out of engagement therewith. During movement between the starting and finish positions, the tape supply is guided for relative movement along the first peripheral surface portion, and tape engagement means are provided for engaging the tape along the first peripheral surface portion after the first peripheral surface portion is separated from the substrate. The tape engagement means affords relatively free longitudinal movement of the tape, but restricts movement of the tape in a direction normally away from the first peripheral surface portion. The tape is severed between the first and second peripheral surface portions, providing a new tape end part along the first peripheral surface portion. After separation of the head and taped substrate, the head and new tape end part are, if required, returned to a position affording repetition of the taping cycle (i.e. such movement being required if relative movement between the head and substrate is not provided entirely by movement of the substrate).

The novel tape engagement means, which in this device engages the newly severed tape end part during the taping cycle, affords returning the tape end with the tape head to a position for repetition of the taping cycle and positions the tape end part adjacent the peripheral surface of the tape head when the device is not in use. The tape engagement means consists of a pair of spaced brushes each having resilient bristles. The brushes are positioned with their bristles axially parallel and the tips of their bristles in opposed relationship. The brushes are adapted to receive a length of a web such as the tape with the bristles axially aligned parallel to and transverse of the surfaces of the web. The brushes are spaced so that the ends of the bristles on each brush project along both surfaces of the web for a short distance from its adjacent edge. During longitudinal movement the edges of the web slide between the bristles so that the bristles offer little resistance to such movement. Since the bristles must deflect to allow movement of the web in a direction normally away from its surface, the resiliency of the bristles restrict movement of the web in that direction. In the aforementioned device the brushes are attached to arm means mounted on the taping head for movement from an engage position with the brushes flanking the first peripheral surface portion of the taping head; and a release position with the brushes spaced from the first surface portion and positioned along the sides of the taping head. The arm means is biased to its engage position to engage tape along the first peripheral surface portion when the first peripheral surface portion is not pressing a length of tape into engagement with a substrate (i.e. when the device is not in use, or when the first peripheral surface portion moves out of engagement with the substrate toward the end of the tape applying cycle); and is adapted to be moved to its release position by contact with a substrate when the head and substrate are moved to their starting position. The bristles are resiliently deflected to afford movement of the tape engagement means to its release position when the head is pressed against the substrate, and to afford movement of the tape engagement means into engagement with the tensioned tape after the first portion of the peripheral surface moves out of contact with the substrate.

The device is particularly adaptable to an embodiment affording portable use for applying predetermined lengths of tape around an edge of a box. In this embodiment the device includes a portable frame including a guide shoe having an L-shaped contact surface, and is adapted to be manually positioned with the guide shoe in contact with the edge and adjacent surface of a box to which tape is to be applied. The device includes spring means for affording resilient movement of the first and second peripheral surface portions under a compression force. Normally the peripheral surface portion adjacent the guide shoe projects past the contact surface by a predetermined distance. Thus positioning the shoe in contact with a box causes the spring means to press the tape end part along the first peripheral surface portion into contact therewith. Drive means on the device may be manually activated to move the taping head in a rectilinear path along the guide from the start position with the head at a first end of the guide to the finish position with the head at the other end of the guide. The first and second portions of the head's peripheral surface are disposed generally at right angles to each other, with the first portion sliding along and pressing the tape into engagement with one surface of a box in the guide shoe during a first leg of the head's movement, and the second portion sliding along and pressing the tape into engagement with the other surface of the box during a second leg of the head's movement. The tape head is then returned to the first end of the guide, during which movement the tape engagement means retains and supports the newly severed tape end part along the first portion of the peripheral surface.

BRIEF DESCRIPTION OF THE DRAWING

The present invention will be further described with reference to the accompanying drawing wherein like numbers refer to like parts in the several views, and wherein.

DESCRIPTION OF A PREFERRED EMBODIMENT

Figures 1, 2, 3, 4:
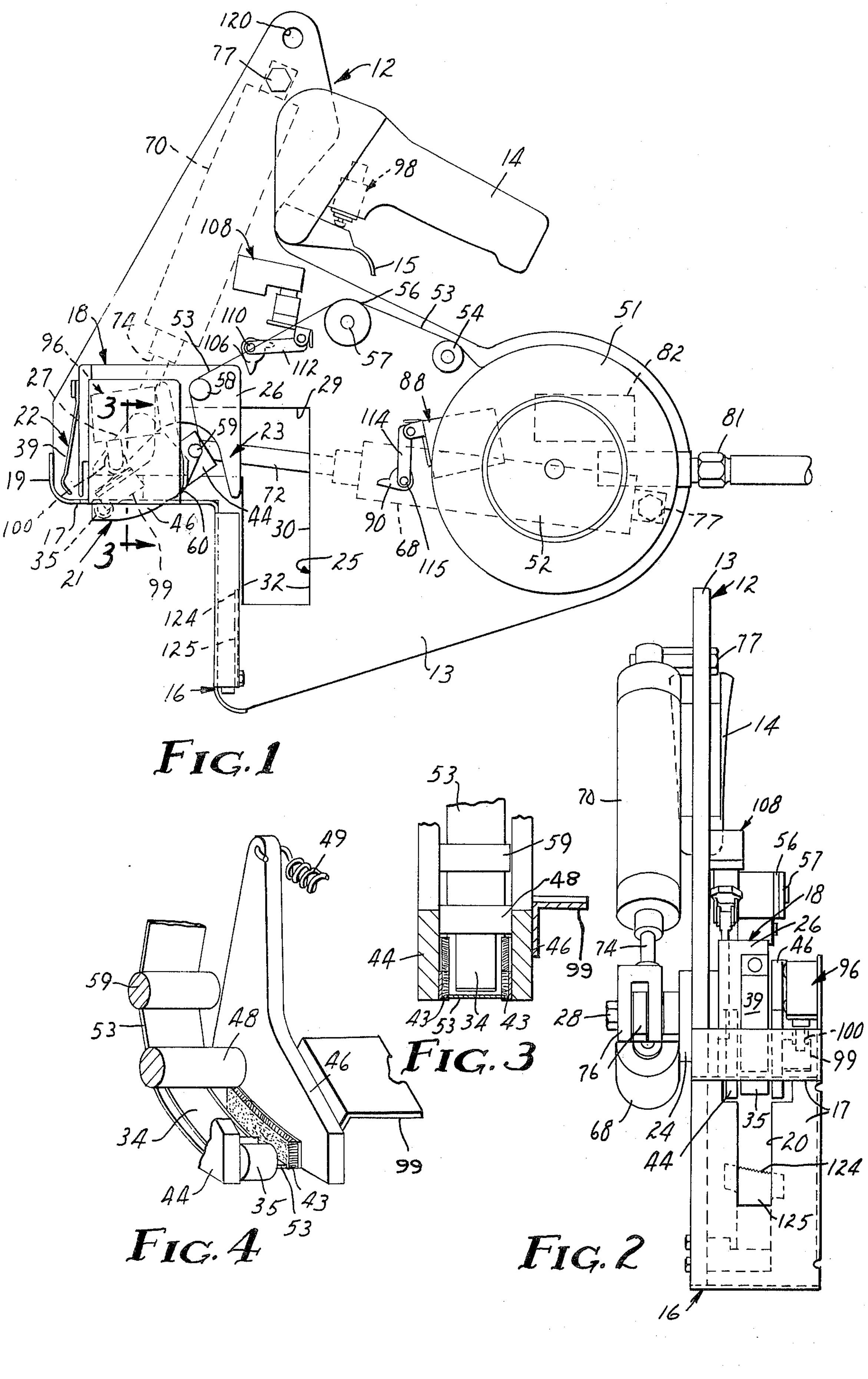
FIG. 1 is a vertical plan view of a tape applying device according to the present invention.
FIG. 2 is a left end view of the device illustrated in FIG. 1.
FIG. 3 is an enlarged fragmentary sectional view taken approximately along the lines 3—3 of FIG. 1.
FIG. 4 is an enlarged fragmentary perspective view illustrating one of a pair of brushes for supporting tape along a taping head in the device of FIG. 1.
Figure 5:
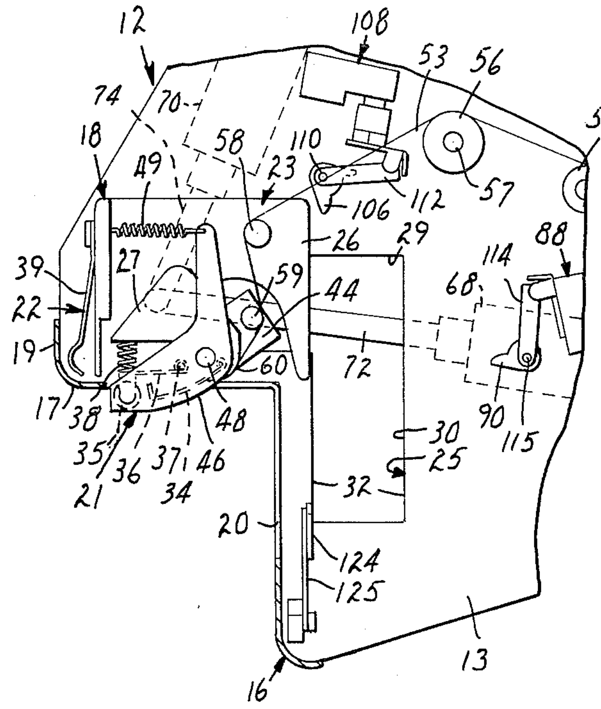
FIGS. 5, 6, 7 and 8 are enlarged fragmentary views, partially in section, of the tape applying head in the device of FIG. 1, which sequentially illustrate positions to which the head moves in applying a length of the tape around the edge of a box.
Figure 6:
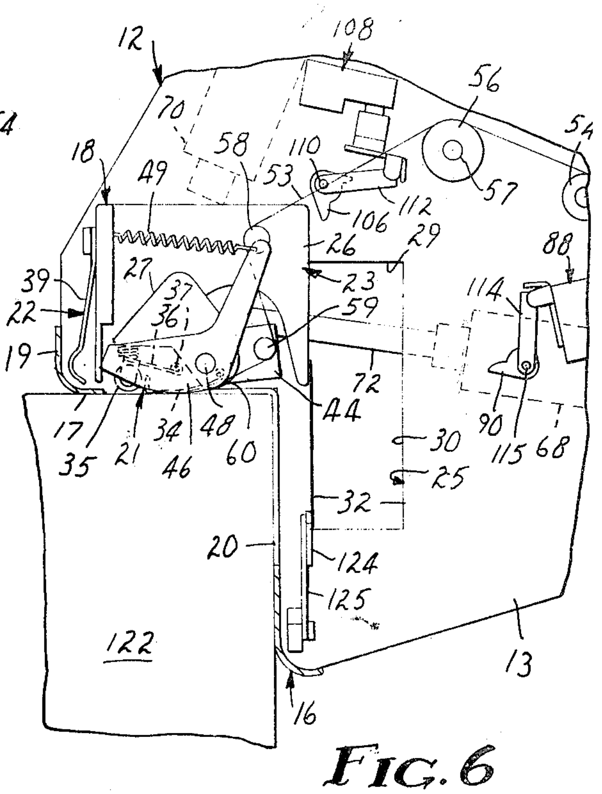
Figures 7, 8:
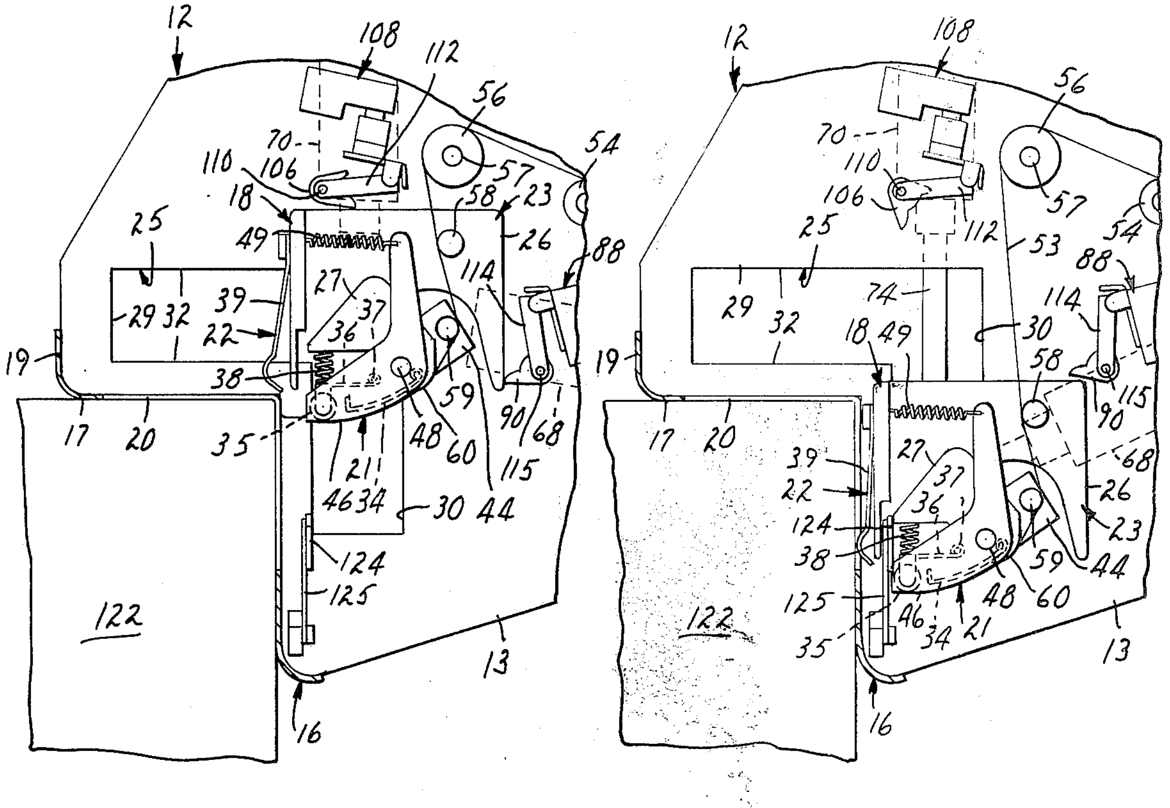

Referring now to the drawing, there is illustrated a portable device according to the present invention, generally designated by the numeral 12, adapted for applying a predetermined length of tape around an edge of a box. The device 12 comprises a frame 13 including a handle 14 adapted for manual engagement to move the device 12 from one box to another, and a guide shoe 16 having an L-shaped contact surface 17 adapted to be positioned in contact with the edge and adjacent surfaces of a box adjacent the area to which tape is to be applied. A tape applying head 18 is mounted on the frame 13 for movement via drive means (which may be manually activated via a trigger 15 pivotally mounted along the handle 14) in a rectilinear path along the guide shoe 16 from a starting position relative to the frame 13 at a first end 19 of the shoe 16 (FIGS. 1, 5 and 6), to a finish position at the other end of the shoe 16 (FIG. 8). During such movement a first peripheral surface portion 21 or a second peripheral surface portion 22 of the head 18 projects through a slot 20 in the guide shoe 16 (FIG. 2). Tape engagement means are provided for supporting the end part of a length of tape along the first peripheral surface portion 21 of the head 18 when the device 12 is not positioned adjacent a box (FIGS. 3, 4, and 5). Biasing means are provided for pressing the tape end part along the first peripheral surface portion 21 into engagement with one surface of a box as the guide shoe 16 is positioned thereon (FIG. 6), and for forcefully biasing the peripheral surface portion, 21 or 22, adjacent the box against the length of tape to adhere it to the box while the head is driven from the starting position to the finish position. Severing means are provided for severing the applied predetermined length of tape from a supply of tape mounted on the device as the head 18 reaches the finish position (FIG. 8), after which the tape engagement means again supports the newly formed tape end part along the first peripheral surface portion 21 of the taping head 18 as the head 18 is returned to the starting position in readiness to again apply a predetermined length of tape to a box.

FIGS. 3 through 8 best illustrate the structure of the tape applying head 18, and its movement from the starting to the finish positions. The taping head 18 comprises a rigid body 23 including a rectangular block 24 slidably mounted in an L-shaped opening 25 in the frame 13 to guide the movement of the head 18 between the starting and finish positions. A first plate 26 is fixedly attached to one side of the rectangular block 24, and a second plate 27 is attached to the side of the first plate 26 opposite the block 24. The first and second plates 26 and 27 support means defining the first and second peripheral surface portions 21 and 22 of the head 18 which will later be explained. A bolt 28 projects from the side of the head 18 opposite the plates 26 and 27, to which bolt 28 is coupled drive means which afford movement of the head 18 between the starting and finish positions.

The rectangular block 24 has a rectangular channel formed around its periphery. The L-shaped opening 25 in the frame 13 extends around the guide shoe 16, with first and second legs 29 and 30 of the opening 25 each being defined by walls 32 spaced a predetermined distance from each other. The walls 32 engage the channel in the rectangular block 24 and afford sliding movement of the tape head 18 between the starting and the finish first and second positions (said portions being defined by abutment of the rectangular block 24 at the opposite ends of the opening 25), with the walls 32 defining the first leg 29 of the opening 25 engaging the channels on two opposite sides when the rectangular block 24 is along the first leg 29, and the walls 32 defining the second leg 30 engaging the channels on the other two opposite sides when the rectangular block 24 is along the second leg 30. Thus the taping head 18 moves between the starting and finish positions without pivoting relative to the frame 13.

The first peripheral surface portion of the head 21 is defined by a leaf spring 34 cantilevered from the second plate 27 of the body 23 and a roller 35 rotatably mounted in a bracket 36. The bracket 36 is pivotally mounted on the second plate 27 about a pin 37, and is biased away from the second plate 27 by a coil spring 38. A curved end of a leaf spring 39 cantilevered from a projection on the first plate 26 defines the second peripheral surface portion 22 of the head 18 which adjoins the first peripheral surface portion 21 at the end of the first peripheral surface portion 21 adjacent the first end 19 of the guide shoe 16. The roller 35 and leaf springs 34 and 39 are sufficiently wide to engage the entire width of the backing or nonadhesive side of the tape, and provide means for affording resilient movement of the first and second peripheral surface portions 21 and 22 under a force applied generally normal thereto.

The roller 35 and leaf spring 34 when not compressed extend past the box contact surface 17 of the guide shoe 16 when the head 18 is positioned along the first leg 29 of the opening 25. When pressed against a box, the guide shoe 16 provides means for positioning the head 18 and the box in the starting position with the first peripheral surface portion 21 compressed to press a tape end part thereon against the box under the influence of the springs 34 and 38, and for forcefully pressing the tape against the box in the shoe as the head moves from the starting position along the first leg 29 of the opening 25. The leaf spring 39 when not compressed extends past the contact surface 17 of the guide shoe 16 when the head 18 is positioned along the second leg 30 of the opening 25, and will be compressed to provide means for forcefully pressing the tape against a box in the shoe 16 as the head 18 moves along the second leg 30 of the opening 25.

The tape engagement means for supporting the end part of a length of tape on the first peripheral surface portion 21 when the device 12 is not positioned adjacent a box, and for supporting the newly formed tape end part along the first peripheral surface portion 21 as the head 18 returns from the finish to the starting position includes a pair of spaced brushes 43. The brushes 43, best seen in FIGS. 3 and 4, each include a backing supporting a multiplicity of resilient bristles. A preferred material for the brushes 43 is that sold under the trade designation VN—100 Vertically Oriented "Fibre-Tran" by the Minnesota Mining and Manufacturing Company of St. Paul, Minnesota, which comprises 50 denier (about 0.003 inch diameter) nylon bristles which project about 0.15 inch from the backing. The brushes 43 are attached to arm means comprising a pair of spaced arms 44 and 46 and are positioned with their bristles axially parallel, and with the tips of their bristles in opposed relationship. A pin 48 attaches the arms 44 and 46 together, and mounts them on the second plate 27 for pivotal motion from an engage position (FIGS. 1 through 5, 7 and 8) with the brushes 43 flanking opposite sides of the tape along the first peripheral surface portion 21; and a release position (FIG. 6) with the brushes 43 spaced from the first surface portion 21 and positioned on opposite sides of the second plate 27. A spring 49 in tension between the first plate 26 and the arm 46 provides means for biasing the arms 44 and 46 to their engage position. The edge surfaces of the arms 44 and 46 which project beyond the contact surface 17 when the head 18 is in the starting position are adapted for engagement by the surface of a box so that pressing the shoe 16 into engagement with a box will move the arms 44 and 46 to their release position.

In their engage position, the arms 44 and 46 space the brushes 43 so that the ends of the bristles on each brush 43 project for a short distance transverse to the surfaces of the tape from the adjacent edge, thereby offering little resistance to longitudinal movement of the tape along the first peripheral surface portion 21, but restricting movement of tape at a right angle away from the first peripheral surface portion 21. The bristles are sufficiently resilient, however, to deflect over the tape along the first peripheral surface portion 21 as the arms 44 and 46 move between their engage and release positions.

As an example, when used with one-half inch wide tape, brushes having 0.15 inch long 50 denier bristles, preferably are spaced at about 0.440 inch so that the bristles from each brush 43 project about 0.030 inch along the surface of the tape.

The supply of tape on the device includes a roll 51 of tape supported on a flanged hub 52 rotatably mounted on the frame 13, and a length 53 of tape extending from the roll 51 to the tape applying head 18 past the end of the first peripheral surface portion 21 opposite the second peripheral surface portion 22. A series of rollers having axially corrugated peripheries of a hard plastic support the adhesive surface of the length of tape between the roll 51 and the head 18. These rollers include a first idler roller 54, a second roller 56 mounted on a one-way clutch 57 to prevent its rotation in a direction other than that affording movement of the tape toward the head 18, and a third roller 58 rotatably mounted on the first plate 26 which together with a fourth roller 59 on the arm 44 provides means for guiding the tape along the first peripheral surface portion 21 for any position of the head 18. From the fourth roller 59 the length 53 of tape extends with its backing contacting a curved surface 60 on the second plate 27 of the body 23, and along the first peripheral surface portion 21 between the brushes 43.

The one-way clutch 57 between the second roller 56 and the frame 13 provides means for absorbing tensile forces exerted in the length 53 of tape between the tape roll 51 and the second roller 56 due to inertia in the roll 51 and hub 52 when the device 12 is operated, which forces might otherwise pull the end of tape from between the brushes 43. Also, adhesive contact between the length 53 of tape and the corrugated peripheries of the rollers 54, 56, and 58 provides means for tensioning the length 53 of tape along the first peripheral surface portion 21 during operation of the device 12, thereby causing the bristles of the brushes 43 to deflect over the tensioned tape when the arms 44 and 46 return to their engage positions during travel of the head 18 along the second leg 30 of the opening 25, rather than lifting the tape from the first peripheral surface portion 21.

The drive means includes first and second air cylinders 68 and 70 (FIGS. 1 and 2) each having their piston rods (72 and 74 respectively) pivotally attached via clevices 76 to the bolt 28 which projects from the taping head 18 in a direction normal to its direction of travel along the opening 25. The housings of air cylinders 68 and 70 are each pivotally mounted to the frame 13 by a bolt 77 at one end, and are dispersed at an angle to each other so that the first cylinder 68 controls movement of the head 18 along the first leg 29 of the opening 25, and the second cylinder 70 controls travel of the head 18 along the second leg 30 of the opening 25.

Figure 9:
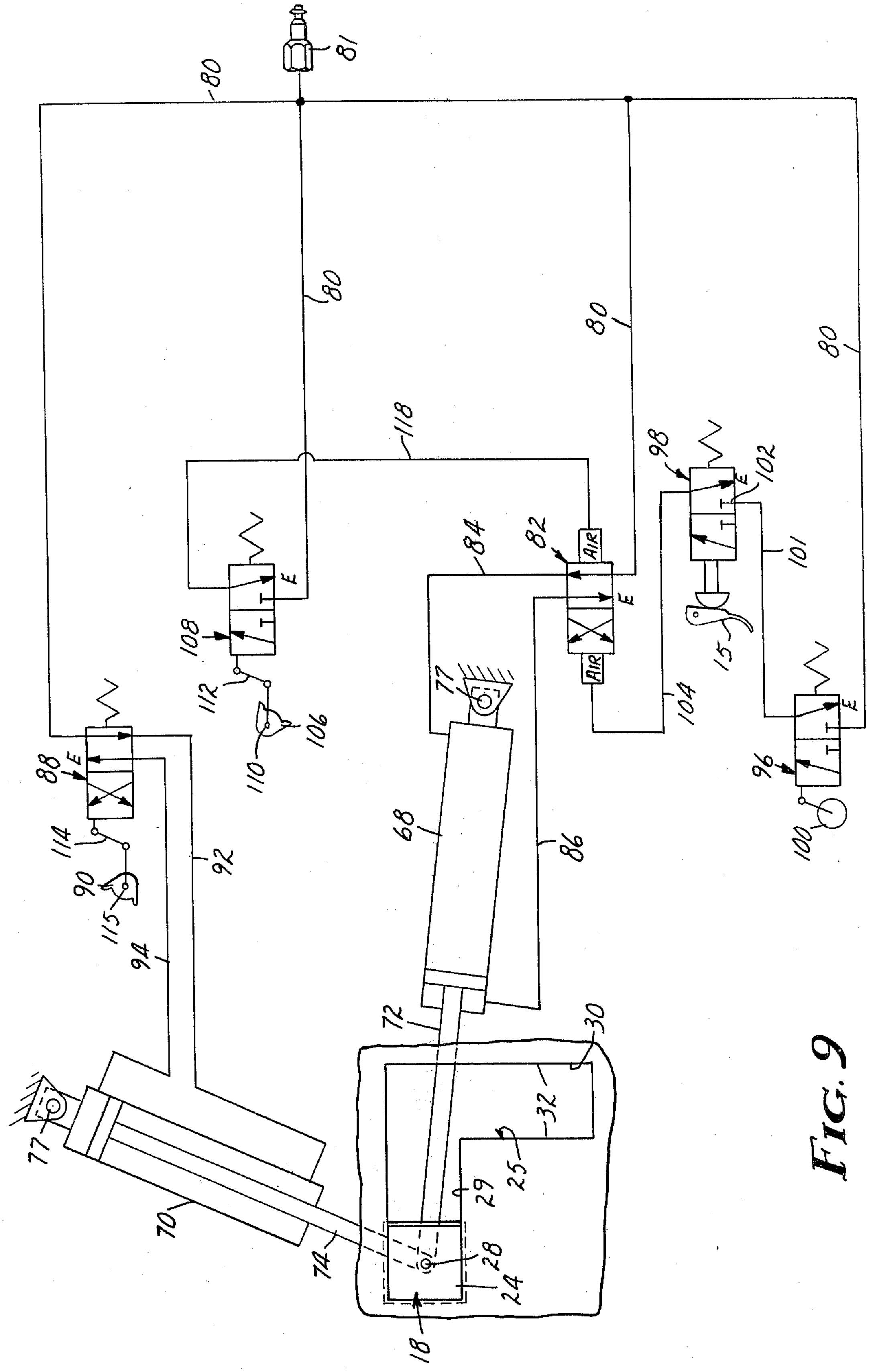
FIG. 9 is a schematic diagram of an air operated drive for the device of FIG. 1 which moves the head in the manner illustrated in FIGS. 5 through 8.

An air control circuit for the air cylinders 68 and 70 is schematically illustrated in FIG. 9 with the use generally of the American Standards Association Fluid Power Symbols. The locations of the various valves in the air control circuit are illustrated in FIGS. 1 through 8, but the air lines have not been illustrated to simplify the drawing.

Referring now to FIGS. 1 and 9, an air line 80 may be coupled to a source of air under pressure at a male quick disconnect coupling 81. Initially the air line 80 communicates with the first cylinder 68 through a double air pilot operated valve 82 and an air line 84, and the cylinder 68 is exhausted through an air line 86 and the valve 82 to extend the piston rod 72. Also the air line 80 communicates with the second cylinder 70 through a spring return valve 88 actuated by a one-way trip 90, and an air line 92, and the second cylinder 70 is exhausted through an air line 94 and the valve 88 to retract the piston rod 74 into the second cylinder 70. With the piston rod 72 extended and the piston rod 74 retracted, the tape head 18 is positioned at the starting position at the end of the first leg 29 of the opening 25 (FIGS. 5, 6 and 9). The air line 80 also communicates with a closed port of a spring return valve 96 fixed to the shoe 16 which prevents air from reaching a spring return valve 98 operated by the trigger 15, thereby preventing operation of the device 12. When, however, the shoe 16 is pressed against a box causing the arms 44 and 46 to retract (FIG. 6), a bracket 99 fixed to the arm 46 (FIG. 1) engages a roller 100 to move the spool in the spring return air valve 96. This connects line 80 with a line 101 and provides air pressure at a port 102 of the valve 98 operated by the trigger 15. When the operator depresses the trigger 15 the spool of the valve 98 is moved to connect the port 102 with an air line 104, which applies air pressure to move the spool in the air piloted valve 82, thereby applying pressure through the line 86 and exhausting the line 84 to move the piston rod 72 into the cylinder 68. This moves the head 18 toward the end of the first leg 29 of the opening 25 adjacent the cylinder 68 (FIG. 9). During this movement the bracket 99 on the arm 46 moves out of contact with the roller 100, which allows the spool in valve 96 to shift, thereby disconnecting the air line 80 from the line 101 and exhausting the air line 101 so that further manipulation of the trigger 15 will not affect the cycle. Also, the first plate 26 of the taping head 18 contacts a one-way trip 106 on a spring return valve 108, but does not activate the valve 108, as the trip 106 rotates on a pin 110 against the bias of a light spring without moving an actuating arm 112 for the valve 108 (FIG. 7).

When the head 18 reaches the end of the first leg 29 of the opening 25 adjacent the first cylinder 68, the taping head 18 contacts the end of the one-way trip 90 (FIG. 7) which is positioned so that such contact will pivot an arm 114 to move the spool of valve 88, thereby applying pressure through the line 94 and exhausting line 92 to extend the piston rod 74 from the second cylinder 70. This moves the taping head 18 along the aligned second leg 30 of the opening 25. The rectangular block 24 will not catch on the corner between the legs 29 and 30 of the opening 25 because the cylinder 68 pulls the head 18 against the adjacent wall 32. The first plate 26 of the body 23 slides along the trip 90 to maintain actuation of the valve 88 to an end position of the head's 18 travel along the second leg of the opening 25 defined when the body 23 moves beyond the trip 90 (FIG. 8). When the trip 90 is released, the spool in valve 88 returns to its normal position, applying pressure to the line 92 and exhausting the line 94 to retract the piston rod 74 and return the taping head 18 along the second leg 30 of the opening 25. During this return movement, the tape head 18 will again contact the trip 90, which will now pivot around a pin 115 against a light spring without moving the actuating arm 114 for the valve 88.

When the head 18 again reaches the intersection between the legs 29 and 30 of the opening 25, the tape head 18 will contact the end of the one-way trip 106 which is aligned so that the arm 112 is depressed to move the spool in the valve 108, thereby connecting the line 80 to a line 118 and moving the spool in the air piloted valve 82. This again pressurizes line 84 and exhausts line 86 to cause the piston rod 72 to extend and move the tape head 18 toward the starting position. Again the rectangular block 24 will not catch on the corner between the legs 29 and 30 of the opening 25 because the second cylinder 70 pulls the head 18 against the adjacent wall 32 of the first leg 29. During this movement, of the head 18 along the first leg 29, the tape head 18 slides along the trip 106 in the proper direction to maintain actuation of the valve 108 until the tape head 18 moves beyond the trip 106 at the start position. This allows the valve 108 to return to its normal position, and the device 12 can again be activated by positioning the shoe 16 against a box to move the bracket 99 on the arm 46 against the roller 98, and manually depressing the trigger 15.

When the frame 13 and body 23 are made of magnesium, the entire device 12 (including protective side covers for the mechanism which were not shown) adapted for applying a strip of one-half inch wide tape about 4¼ inches long can be constructed to have a weight of less than about 8 pounds. Even this relatively small weight can, if desired, be counterweighted by attaching a counterweight device to an opening 120 in the frame 13.

The device 12 will dispense a wide variety of tapes including the very strong transparent polyester film tape reinforced with continuous glass yarn filaments which is sold under the trade designation 898 Filament Tape by Minnesota Mining and Manufacturing Company, St. Paul, Minnesota.

OPERATION

An end part of the supply of tape is initially positioned along the first peripheral surface portion 21 between the brushes 43 with its terminal end adjacent the second peripheral surface portion 22 of the tape head 18 defined by the leaf spring 39 (FIGS. 3 and 4).

When the shoe 16 is positioned over the edge of a box 122 to be taped (FIG. 6), the projecting edges of the arms 44 and 46, contact the box 122 and are thereby pressed to their release position against the bias of the spring 49. The bristles of the brushes 43 are thus deflected over the edges of the end part of the tape, and the end part of the tape is pressed and adhered to the box 122 by the roller 35 and/or leaf spring 34 which normally project beyond the contact surface 17 of the shoe 16 as is illustrated in FIG. 5.

After the shoe is positioned over the box 122, the drive means may be manually actuated via the trigger 15 so that the tape applying head 18 will be driven from the starting position (FIG. 6) along the first leg 29 of the opening 25 toward and past the intersection of the portions of the contact surface 17 at the edge of the box (FIG. 7). During this travel the spring 34 and roller 35 move along the tape and provide a predetermined pressure to adhere the tape to one surface of the box 122. When the tape head 18 has moved so that the roller 35 has passed the edge of the box (FIG. 7), the drive means moves the head 18 (which does not pivot relative to the frame 13) along the second leg 30 of the opening 25 which is disposed at a right angle to the first leg of the opening 25. While the head 18 is moving along the second leg 30 of the opening 25, the tape is drawn along the first peripheral surface portion 21 of the head 18, and the arcuate end of the spring 39 defining the second peripheral surface portion of the head 18 biases the tape into engagement with the adjacent surface of the box (FIG. 8).

As the tape head closely approaches the finish position at the end of the second leg 30 of the opening 25, a knife 124 engages the tape extending over an opening in the body 23 along the first peripheral surface portion 21. The knife 124 has a serrated edge inclined with respect to the surfaces of the tape on the frame 13, and is mounted to the frame via a flat spring 125. The spring 125 allows the knife 124 to travel with the tape a short distance along the first peripheral surface portion 21 while the edge of the knife 124 progressively and cleanly cuts across the tape and subsequently severs the tape adjacent the second peripheral surface portion 22 of the tape head 18 (FIG. 8).

During travel of the taping head 18 along the second leg 30 of the opening 25, the arms 44 and 46 are out of engagement with the box 122, and move to their engage position under the influence of the spring 49, deflecting the bristles of the brushes 43 over the edges of the tape which is tensioned along the first peripheral surface portion 21 by the force required to pull its adhesive surface across the rollers 54, 56, and 58. Thus the brushes 43 engage the tape adjacent its newly severed end and hold it against the spring 34 so that the new end part of the tape will be retained against the first peripheral surface portion 21 of the head 18 as the drive mechanism returns the head 18 to the start position (FIG. 5).

Also, because the arms 44 and 46 are in their engage position, the projecting ends of the arms 44 and 46 will engage and push a box from within the guide shoe 16 during return movement of the head 18 along the first leg of the opening 25 if the operator has not already removed the device 12 from the box. This means for ejecting a box from the guide shoe subsequent to taping insures that the tape along the first peripheral surface portion 21 will not prematurely contact and adhere to a box.

In addition to the application of lengths of tape around the edge of a box, the device 12 will also apply a length of tape around a curved surface such as the periphery of a cylinder which is positioned in the guide shoe 16.

While the present invention has been described with respect to an embodiment which is preferred for applying tape around the corner of a box, numerous changes could be made in the embodiment shown, or the invention can be embodies in a form for applying tape to surfaces of other shapes without departing from the spirit of the invention. For example in the illustrated embodiment instead of the springs 34, 38, and 39 which provide means for biasing the adjacent surface of the tape head against a box in the guide shoe 16, the tape applying head could have rigid peripheral surface portions, and the entire head could then be biased against a box in the guide shoe by spring means between the tape applying head and the frame. The device could be embodied to apply tape to a planar surface by rotating the head as it moves between the starting and the finish positions, or by moving and revolving the planar surface against a stationary head, or by various combinations of movement between the head and a substrate to which tape is to be applied which: (1) afford means for positioning the tape applying head in a predetermined starting position relative to a substrate with the first peripheral surface portion of the head forcefully pressing a tape end part thereon against the substrate; and (2) then causes relative sliding movement between the adjacent peripheral surface portion of the tape applying head to forcefully press the tape against the substrate until a finish position is reached at which the first peripheral portion is out of engagement with the substrate so that tape thereon will be engaged by the tape engagement means therealong and the tape is cut between the peripheral surface portions.

Thus the scope of the present invention should not be limited to the embodiment disclosed herein, but should only be interpreted in light of the language in the claims.

I claim:

1. A device adapted for applying predetermined lengths of pressure sensitive adhesive tape to a substrate from a supply of pressure sensitive adhesive tape, comprising:

- a tape applying head having first and second adjacent angularly disposed peripheral surface portions each adapted for contacting the nonadhesive surface of said tape;
- means adapted for guiding a said supply of adhesive tape across said first peripheral surface portion from the end thereof opposite said second peripheral surface portion;
- tape engagement means adapted for engaging the edges of a said tape to releasably support the tape in a direction normal to its surfaces while affording relatively free longitudinal movement thereof;
- means mounting the tape engagement means on the tape applying head for movement between an engage position at the edges of said first peripheral surface portion to engage tape therealong, and a release position with said tape engagement means displaced from the engage position and out of engagement with tape along said first peripheral surface portion, said means mounting the tape engagement means being adapted to be moved to said release position by contact with a said substrate moved into contact with tape along said first peripheral surface portion;
- means for positioning said tape applying head in a predetermined starting position relative to a said substrate with the first peripheral surface portion forcefully pressing an end part of a said tape thereon against a said substrate, thereby moving said means mounting the tape engagement means to said release position and adhering the tape end part to the substrate;
- means adapted for providing relative sliding movement between said tape applying head and said adhesive tape with the head forcefully urging said length of tape being applied against said substrate from said starting position to a finish position, and for positioning the second peripheral surface portion adjacent the substrate at the finish position;
- means for tensioning the tape supply along said first peripheral surface portion during said relative sliding movement between the starting and finish positions;
- means for biasing said means mounting the tape engagement means to said engage position with sufficient force to move said tape engagement means over a tape tensioned along said first peripheral surface portion; said means mounting said tape engagement means being shaped to afford movement to said engage position under the influence of said biasing means at said finish position; and means adapted for severing a said supply of adhesive tape between said first and second peripheral surface portions at said finish position.

2. A device according to claim 1, wherein said tape engagement means comprises a pair of brushes, each brush having a backing and a multiplicity of parallel resilient spaced bristles projecting from said backing, said brushes being mounted by said means mounting the tape engagement means with the bristles of both brushes projecting toward each other and extending a short distance from the edges and along the major surfaces of tape along said first peripheral surface portion when said means mounting the tape engagement means is in said engage position so that the bristles on the brushes afford slight resistance to longitudinal movement of the tape while releasably supporting the tape in a direction normal to its surfaces along the first peripheral surface portion.

3. A device according to claim 2, wherein said bristles are of about 50 denier nylon, project about 0.15 inch from said backing, and the spacing of said brushes is adapted with respect to the width of a said tape to project the ends of the bristles about 0.03 inch along the major surfaces from the edges of tape centered between the brushes.

4. A device according to claim 1, wherein said device is portable, said means for positioning said tape applying head comprises a guide shoe having a contact surface adapted for engagement with a said substrate adjacent the area of tape application, and said tape applying head is mounted for movement along said guide shoe between said starting position and said finish position.

5. A device adapted for applying a length of pressure sensitive adhesive tape around an edge at the intersection of first and second surfaces of a box from a supply of pressure sensitive adhesive tape, said device comprising:

a frame including a guide shoe having an L-shaped contact surface extending between first and second ends and adapted to contact the first and second surfaces of a said box adjacent the area of tape application;

a tape applying head having first and second adjacent angularly disposed peripheral surface portions each adapted for contacting the nonadhesive surface of said tape, said head being mounted on said frame for movement along said guide shoe from a starting position at said first end of said guide shoe and a finish position at said second end of said guide shoe, said movement including a first leg of movement from said starting position with said first peripheral surface portion adjacent the first surface of a said box in said guide shoe and said second peripheral surface portion adjacent the first end of said contact surface, and a second leg of movement ending at said finish position with said second peripheral surface portion adjacent the second surface of the box in said guide shoe;

means for guiding the tape supply across said first peripheral surface portion from its end opposite said second peripheral surface portion;

tape engagement means adapted for engaging the edges of a said tape to releasably support the tape in a direction normal to its surfaces, while affording relatively free longitudinal movement thereof;

means mounting the tape engagement means on the tape applying head for movement between an engage position at the edges of said first peripheral surface portion to engage tape therealong, and a release position with said tape engagement means displaced from the engage position and out of engagement with tape along said first peripheral surface portion, said means mounting the tape engagement means being adapted to move said tape engagement means to said release position by contact with the first surface of a said box against said contact surface when said head is along said first leg of movement;

biasing means for biasing the adjacent peripheral surface portion of the taping head against a said box in said guide shoe so that a tape end part initially retained by said tape engagement means along said peripheral surface portion will be pressed into contact with the first surface of a said box against said contact surface at the starting position of said tape applying head;

means for driving said tape applying head from said starting position to said finish position and for then returning the head to said starting position to provide relative sliding motion between the adjacent peripheral surface portion of the head and the tape adhered to a said box at the starting position with the biasing means forcefully pressing the tape against the box between the starting and the finish positions;

means for tensioning the tape supply across said first peripheral surface portion during movement of said taping head from its starting position to its finish position;

means for biasing said means mounting the tape engagement means to said engage position with sufficient force to move said tape engagement means over a tape tensioned along said first peripheral surface portion so that said means mounting the tape engagement means moves to said engage position under the influence of said biasing means during said second leg of movement; and means adapted for severing a said supply of adhesive tape between the first and second peripheral surface portions at said finish position, whereby said tape engagement means carries the newly severed tape end part as said drive means returns the taping head to its starting position.

6. A device according to claim 5, wherein said tape engagement means comprises a pair of brushes, each brush having a backing and a multiplicity of parallel resilient spaced bristles projecting from said backing, said brushes being mounted by said means mounting the tape engagement means with the bristles of both brushes projecting toward each other and extending a short distance from the edges and along the major surfaces of tape along said first peripheral surface postion when said means mounting the tape engagement means is in said engage position so that the bristles on the brushes afford slight resistance to longitudinal movement of the tape while releasably supporting the tape in a direction normal to its surfaces along the first peripheral surface portion.

7. A device according to claim 6, wherein said bristles are of about 50 denier nylon, project about 0.15 inch from said backing, and the spacing of said brushes is adapted with respect to the width of a said tape to project the ends of the bristles about 0.03 inch along the major surfaces from the edges of tape centered between the brushes along said first peripheral surface portion.

8. A device according to claim 11, wherein said tape applying head includes a body slidably mounted on said frame for movement between said starting and finish positions, and spring means mounted on said body and having end portions defining said first and second peripheral surface portions, said end portions being adapted to normally project beyond said contact surface when adjacent thereto between said start and finish positions of said tape applying head and to be compressed when adjacent a box against said contact surface to provide said biasing means.

9. A method for applying predetermined lengths of pressure sensitive tape to substrates from a supply of the tape, comprising the steps of:

providing a taping head having adjacent angularly disposed first and second peripheral surface portions each adapted to contact the nonadhesive surface of the tape;

supporting an end part of the supply of tape, adhesive side out, along the first peripheral surface portion of the head with an end of the tape supply positioned between the first and second peripheral surface portions;

pressing the tape end part into engagement with the substrate;

moving the head and substrate relative to each other to provide forceful sliding contact between the taping head and the tape with the area of contact therebetween moving away from the end of the tape to a finish position with the second peripheral surface portion contacting the tape and the first peripheral surface portion out of engagement therewith;

guiding the tape supply for relative movement along the first peripheral surface portion during said moving step;

engaging the tape along said first peripheral surface portion during said moving step with means affording relatively free longitudinal movement of the tape, but restricting movement of the tape in a direction normally away from the first peripheral surface portion;

severing the tape supply between the first and second peripheral surface portions at the finish position; and separating the head from the substrate, whereby the newly severed end part is again supported along the first surface portion and may, if required to provide the relative movement between the head and a new substrate, be returned with the head to a position affording repetition of said pressing, moving, guiding, engaging, severing, and separating steps.

* * * * *

UNITED STATES PATENT AND TRADEMARK OFFICE

CERTIFICATE OF CORRECTION

PATENT NO. : 3,909,339

DATED : September 30, 1975

INVENTOR(S) : John T. Verch

It is certified that error appears in the above-identified patent and that said Letters Patent are hereby corrected as shown below:

Column 4, line 39, change the entire line to read -- finish positions (said first and second positions being de- --.

In the Claims

Claim 8, line 1, change "claim 11" to -- claim 5 --.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*